United States Patent
Lee et al.

(10) Patent No.: US 9,525,163 B2
(45) Date of Patent: Dec. 20, 2016

(54) SECONDARY BATTERY AND SECONDARY BATTERY MODULE

(71) Applicant: SAMSUNG SDI CO., LTD., Yongin-si, Gyeonggi-do (KR)

(72) Inventors: Hyun-Soo Lee, Yongin-si (KR); Jang-Hyun Song, Yongin-si (KR); Myung-Jae Jang, Yongin-si (KR)

(73) Assignee: Samsung SDI Co., Ltd., Yongin-Si, Gyeonggi-do (KR)

(*) Notice: Subject to any disclaimer, the term of this patent is extended or adjusted under 35 U.S.C. 154(b) by 152 days.

(21) Appl. No.: 14/497,472

(22) Filed: Sep. 26, 2014

(65) Prior Publication Data

US 2015/0214535 A1    Jul. 30, 2015

(30) Foreign Application Priority Data

Jan. 28, 2014   (KR) .................. 10-2014-0010878

(51) Int. Cl.
| | | |
|---|---|---|
| H01M 2/30 | (2006.01) | |
| H01M 2/20 | (2006.01) | |
| H01M 2/06 | (2006.01) | |
| H01M 2/26 | (2006.01) | |
| H01M 4/66 | (2006.01) | |

(52) U.S. Cl.
CPC ............... *H01M 2/30* (2013.01); *H01M 2/202* (2013.01); *H01M 2/06* (2013.01); *H01M 2/263* (2013.01); *H01M 4/661* (2013.01)

(58) Field of Classification Search
CPC .......... H01M 2/30; H01M 2/202; H01M 2/06; H01M 2/263; H01M 4/661
See application file for complete search history.

(56) References Cited

U.S. PATENT DOCUMENTS

| | | | | |
|---|---|---|---|---|
| 2010/0173178 A1* | 7/2010 | Kim | ...................... | H01M 2/06 429/1 |
| 2011/0159353 A1* | 6/2011 | Byun | ................... | H01M 2/206 429/160 |
| 2012/0288744 A1* | 11/2012 | Guen | ................... | H01M 2/206 429/158 |

FOREIGN PATENT DOCUMENTS

| | | | |
|---|---|---|---|
| JP | 2011216402 A | * 10/2011 | |
| JP | 2012-160339 | 8/2012 | |
| KR | 10-2011-0076738 | 7/2011 | |
| KR | 10-2013-0049984 A | 5/2013 | |
| WO | WO 2011122453 A1 | * 10/2011 | ............ H01M 2/206 |

OTHER PUBLICATIONS

J-Plat Pat machine translation of the detailed description of JP 2011-216402A (Oct. 2011).*

* cited by examiner

*Primary Examiner* — Gregg Cantelmo
(74) *Attorney, Agent, or Firm* — Lee & Morse, P.C.

(57) ABSTRACT

A secondary battery includes an electrode assembly including a first electrode plate, a second electrode plate, and a separator between the first electrode plate and the second electrode plate, a case accommodating the electrode assembly, a cap plate sealing the case, and a first terminal unit and a second terminal unit coupled to the cap plate. The first terminal unit includes a first terminal plate that is electrically connected to the first electrode plate, and the second terminal unit includes a second terminal plate that is electrically connected to the second electrode plate, the second electrode plate having a different shape from the first terminal plate.

16 Claims, 4 Drawing Sheets

SECONDARY BATTERY AND SECONDARY BATTERY MODULE

CROSS-REFERENCE TO RELATED APPLICATION

Korean Patent Application No. 10-2014-0010878, filed on Jan. 28, 2014, in the Korean Intellectual Property Office, and entitled: "Secondary Battery and Secondary Battery Module," is incorporated by reference herein in its entirety.

BACKGROUND

1. Field

Embodiments relate to a secondary battery and a secondary battery module.

2. Description of the Related Art

A secondary battery may be repeatedly discharged and recharged unlike a primary battery that may not be rechargeable. A secondary battery may be economical and may be environmentally friendly.

A secondary battery may be used as a single battery or a plurality of unit secondary batteries may be used as a unit, that is, a battery module may be used according to a kind of external devices to which the secondary battery will be applied.

SUMMARY

Embodiments are directed to a secondary battery including an electrode assembly including a first electrode plate, a second electrode plate, and a separator between the first electrode plate and the second electrode plate, a case accommodating the electrode assembly, a cap plate sealing the case, and a first terminal unit and a second terminal unit coupled to the cap plate. The first terminal unit includes a first terminal plate that is electrically connected to the first electrode plate. The second terminal unit includes a second terminal plate that is electrically connected to the second electrode plate. The second electrode plate has a different shape from the first terminal plate.

The first terminal plate may include a first protrusion protruding upward from an upper surface of the first terminal plate. The second terminal plate may include a mounting portion having a concave shape.

The secondary battery may further include a first insulator disposed between the first terminal plate and the cap plate. The first insulator may include a second protrusion. A lower surface of the first terminal plate may include a recess coupled to the second protrusion.

The second protrusion may overlap the first protrusion.

The first terminal unit may include a first current collector that is integral with the first terminal plate, penetrates through the first insulator, and is bonded to the first electrode plate. The first electrode plate, the first current collector, and the first terminal plate may be made of aluminum.

The second terminal plate may include guide portions at opposite sides of the mounting portion.

The first protrusion and the guide portions may determine a welding location.

The secondary battery may further include a second insulator between the second terminal plate and the cap plate. The second terminal unit may include a second current collector that is integral with the second terminal plate, penetrates through the second insulator, and is bonded to the second electrode plate. The second electrode plate, the second current collector, and the second terminal plate may be made of copper.

Embodiments are also directed to a secondary battery module including a plurality of secondary batteries arranged in parallel with each other along a direction, and a plurality of bus bars for electrically connecting the plurality of secondary batteries to each other. Each of the plurality of secondary batteries includes an electrode assembly including a first electrode plate, a second electrode plate, and a separator between the first electrode plate and the second electrode plate, a case accommodating the electrode assembly, a cap plate for sealing the case, and a first terminal unit and a second terminal unit coupled to the cap plate. The first terminal unit includes a first terminal plate electrically connected to the first electrode plate. The second terminal unit includes a second terminal plate electrically connected to the second electrode plate. The second electrode plate has a different shape from the first terminal plate. Each of the plurality of bus bars includes a first part bonded to the first terminal plate, and a second part bonded to the second terminal plate, the second part having a different shape from the first part.

The first terminal plate and the first part may be made of a first material. The second terminal plate and the second part may be made of a second material that is different from the first material.

The first terminal plate may include a first protrusion protruding upwardly from an upper surface of the first terminal plate. The first part may include a hole into which the first protrusion is inserted.

The first material may be aluminum. A boundary between the first protrusion and the hole may form a welding line.

The second terminal plate may include a mounting portion having a concave shape. Guide portions may be at opposite sides of the mounting portion.

The second part may be located on the mounting portion. A side surface of the second part may have a height that is the same as a height of the guide portions.

The second part may include a stepped portion on a side portion of the second part.

The second part and the second terminal plate may be made of copper. A boundary between each of the side surfaces of the second part and each of the guide portions may form a welding line.

The secondary battery module may further include a first insulator between the first terminal plate and the cap plate. The first insulator may include a second protrusion. A lower surface of the first terminal plate may include a recess coupled to the second protrusion.

The second protrusion may overlap with the first protrusion.

The first terminal unit may include a first current collector that is integral with the first terminal plate, penetrates through the first insulator, and is bonded to the first electrode plate. The first electrode plate and the first current collector may be made of the first material.

The secondary battery module may further include a second insulator between the second terminal plate and the cap plate. The second terminal unit may include a second current collector that is integral with the second terminal plate, penetrates through the second insulator, and is bonded to the second electrode plate. The second electrode plate and the second current collector may be made of the second material.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
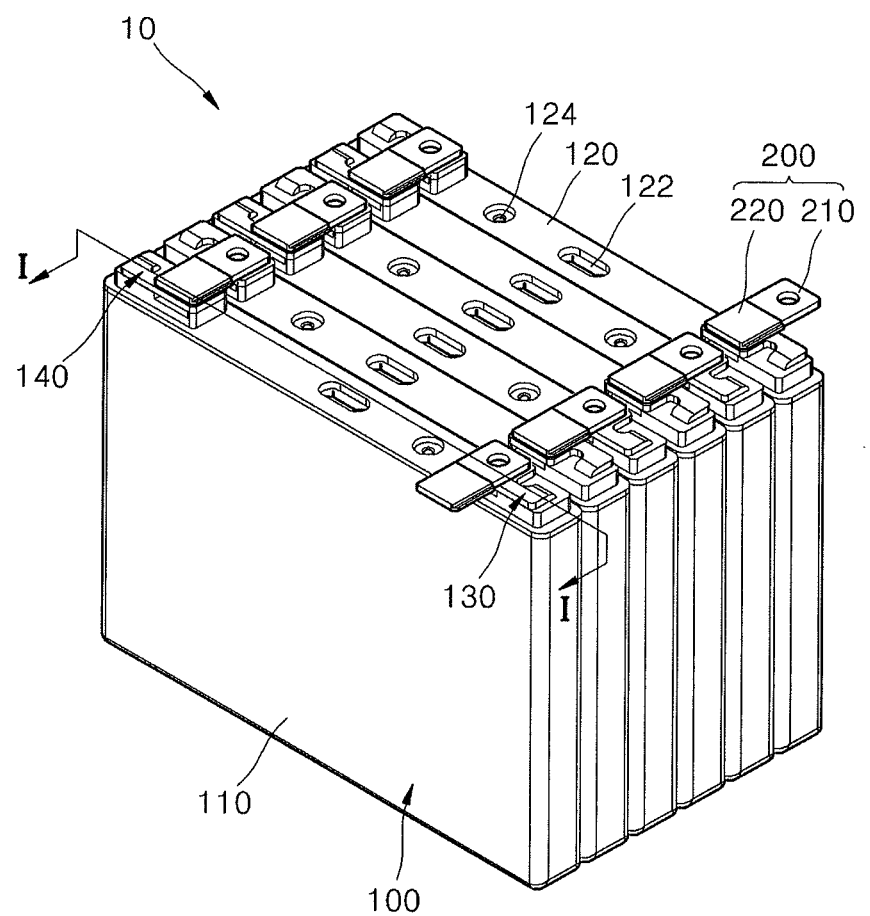
FIG. 1 illustrates a schematic perspective view of a secondary battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Hereinafter, embodiments will be described below with reference to accompanying drawings.

Figure 2:
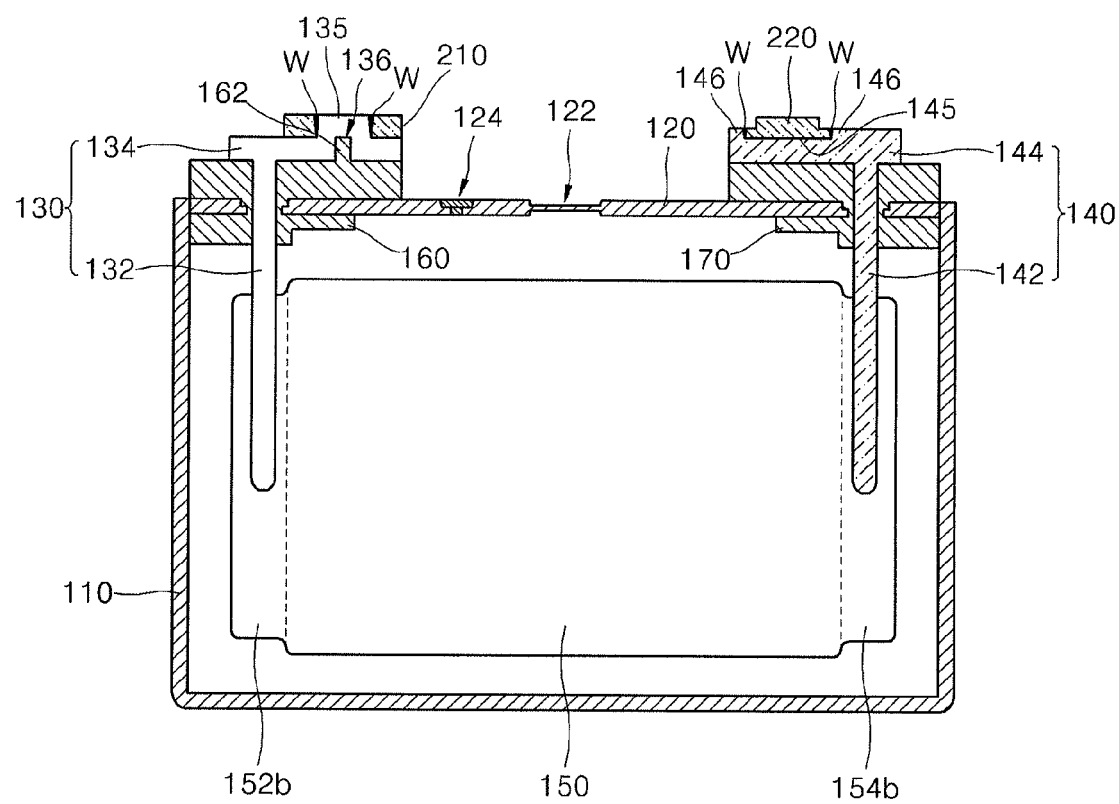
FIG. 2 illustrates a cross-sectional view of the secondary battery module taken along line I-I of FIG. 1.
Figure 3:
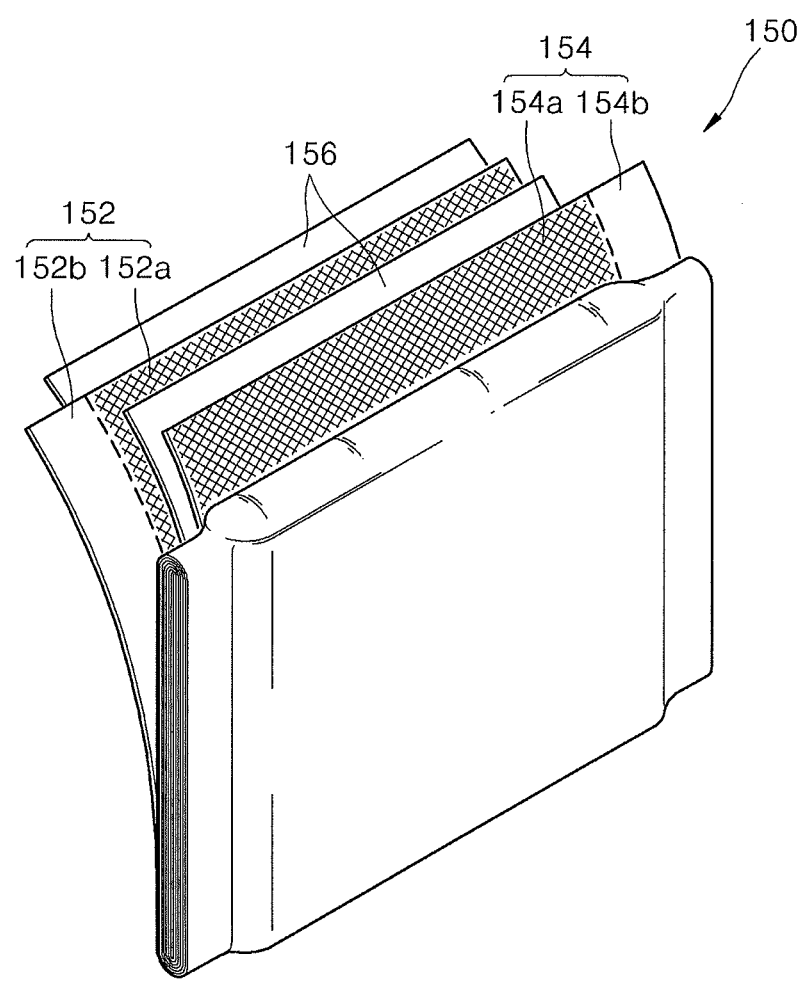
FIG. 3 illustrates a schematic perspective view of a battery assembly of FIG. 2.
Figure 4:
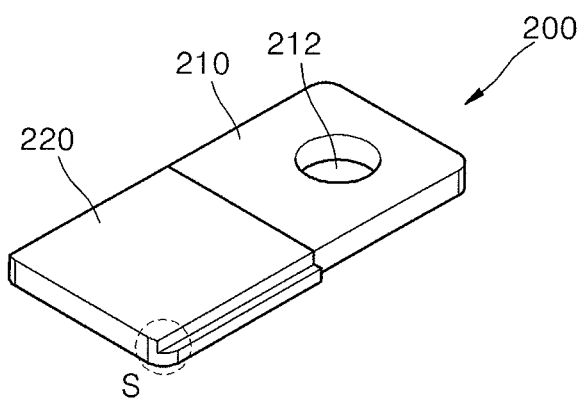
FIG. 4 illustrates a schematic perspective view of a bus bar shown in FIG. 1.
Figure 5:
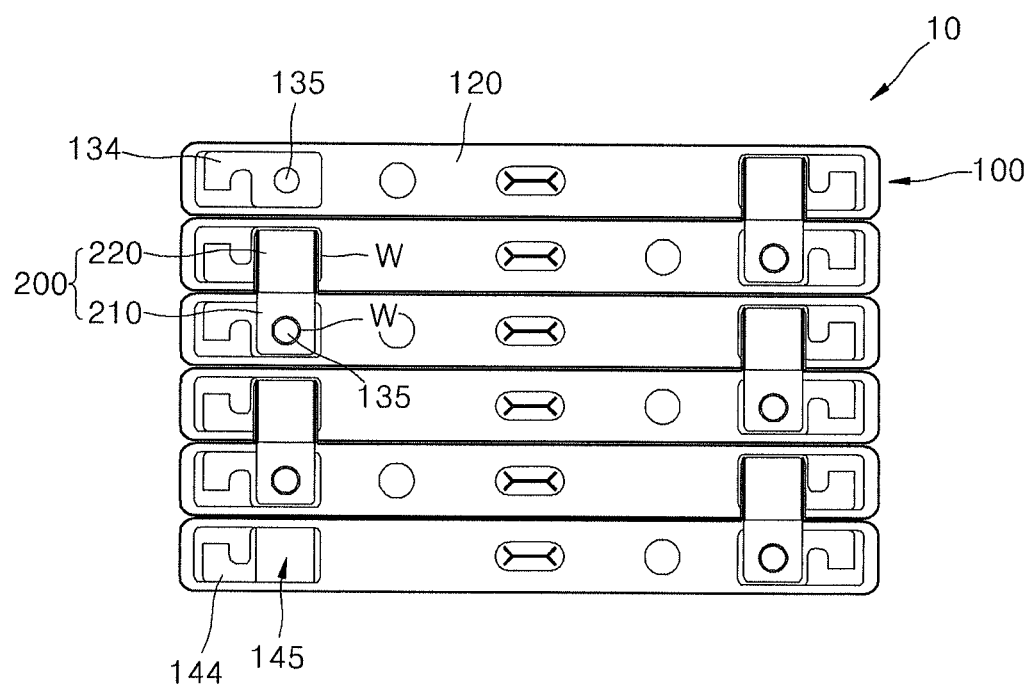
FIG. 5 illustrates a schematic plan view of the secondary battery module of FIG. 1.

FIG. 1 illustrates a schematic perspective view of a secondary battery module 10 according to an embodiment, FIG. 2 illustrates a cross-sectional view of the secondary battery module 10 taken along line I-I of FIG. 1, FIG. 3 illustrates a schematic perspective view of a battery assembly of FIG. 2, FIG. 4 illustrates a schematic perspective view of a bus bar shown in FIG. 1, and FIG. 5 illustrates a schematic plan view of the secondary battery module of FIG. 1.

Referring to FIGS. 1 through 5, the secondary battery module 10 according to an embodiment may include a plurality of secondary batteries 100 arranged in parallel with each other in a direction, and a plurality of bus bars 200 electrically connecting the plurality of secondary batteries 100 to each other.

Each of the plurality of secondary batteries 100 may include an electrode assembly 150, a case 110 accommodating the electrode assembly 150, a cap plate 120 for sealing the case 110, and a first terminal unit 130 and a second terminal unit 140 coupled to the cap plate 120. Each secondary battery 100 may include a first insulator 160 between the cap plate 120 and the first terminal unit 130, and a second insulator 170 between the cap plate 120 and the second terminal unit 140.

The electrode assembly 150 may include a first electrode plate 152, a second electrode plate 154, and a separator 156 disposed between the first and second electrode plates 152 and 154. For example, the electrode assembly 150 may be formed by sequentially stacking the first electrode plate 152, the separator 156, and the second electrode plate 154, and winding the stacked substances as a jelly-roll type. In other implementations, the electrode assembly 150 may be formed by sequentially stacking the first electrode plate 152, the separator 156, and the second electrode plate 154 a plurality of times.

The first electrode plate 152 may include a first active material portion 152a on which a first active material is applied, and a first plain portion 152b (for example, an uncoated portion) on which the first active material is not applied. The first active material portion 152a may be formed by applying the first active material on a part of at least one surface of an aluminum plate, for example. The remaining part of the aluminum plate, on which the first active material is not applied, may be the first plain portion 152b. The first active material may be a transition metal oxide containing lithium such as $LiCoO_2$, $LiNiO_2$, $LiMnO_2$, or $LiMnO_4$, or a cathode active material such as a lithium chalcogenide compound.

The second electrode plate 154 may include a second active material portion 154a on which a second active material is applied and a second plain portion 154b on which the second active material is not applied. The second active material portion 154b may be formed by, for example, applying the second active material on a part of at least one surface of a copper plate. The remaining part of the copper plate, on which the second active material is not applied, may be the second plain portion 154b. The second active material may be, for example, an anode active material such as a carbon material such as crystalline carbon, amorphous carbon, a carbon composite, or carbon fiber, lithium metal, or a lithium alloy.

The separator 156 may be manufactured, for example, by coating a poly(vinylidene fluoride) (PVDF)-hexa fluoro propylene (HFP) co-polymer on a base material selected from the group of polyethylene (PE), polystyrene (PS), polypropylene (PP), and a co-polymer of PE and PP.

In addition, when winding the first electrode plate 152, the separator 156, and the second electrode plate 154, the first electrode plate 152 and the second electrode plate 154 may be arranged based on the separator 156 alternately from each other so that the first plain portion 152b is located at an end portion of the electrode assembly 150 and the second plain portion 154b is located at the other end portion of the electrode assembly 150. The first plain portion 152b and the second plain portion 154b may be located at opposite ends of the electrode assembly 150 based on a width direction of the electrode assembly 150.

The case 110 may have an opening on an upper portion thereof such that the electrode assembly 150 may be inserted in the opening. The case 110 may be formed of a conductive material such as aluminum. The case 110 may protect the electrode assembly 150 against external shock, and may act as a heat dissipation plate for discharging heat generated according to charging/discharging operations of the electrode assembly 150 to the outside.

The cap plate 120 may be formed of the same material as that of the case 110. After accommodating the electrode assembly 150 in the case 110, the cap plate 120 may be disposed at a side of the case 110 and may be bonded to the case 110 via welding so as to seal the case 110.

The cap plate 120 may include a safety vent 122. The safety vent 122 may be broken if an internal pressure in the case 110 becomes excessively high, such that a gas may be discharged to the outside of the case 110.

The cap plate 120 may include an electrolyte injection hole 124. After the cap plate 120 is coupled to the case 110, an electrolyte may be injected into the case 110 via the electrolyte injection hole 124. After finishing the injection of the electrolyte, the electrolyte injection hole 124 may be sealed.

The first terminal unit 130, which is electrically connected to the first electrode plate 152, and the second terminal unit 140, which is electrically connected to the second electrode plate 154, may be coupled to the cap plate 120. The first insulator 160 and the second insulator 170 may be respectively disposed between the cap plate 120 and the first terminal unit 130, and between the cap plate 120 and the second terminal unit 140.

The first terminal unit 130 may include a first current collector 132 and a first terminal plate 134 that are integrally formed with each other. The first terminal unit 130 may be formed of a first material. The first material may be, for example, aluminum. For example, the first material of the first terminal unit 130 may be the same as the material of the first electrode plate 152.

The first current collector 132 may be bonded to the first plain portion 152b via welding after penetrating through the first insulator 160. The first current collector 132 and the first plain portion 152b may be formed of aluminum. Accordingly, the welding between the first current collector 132 and the first plain portion 152b of the same kinds of metal may provide an excellent bonding strength.

The first terminal plate 134 may include a first protrusion 135 protruding outward from an upper surface of the first terminal plate 134. The first protrusion 135 may align a location of a first part 210 of a bus bar 200, as will be described below. A boundary between the first protrusion 135 and a hole 212 formed in the first part 210 of the bus bar 200 may form a welding line W. Accordingly, the first protrusion 135 may determine a welding location.

The first insulator 160 may insulate between the first terminal unit 130 and the cap plate 120 and between the first terminal unit 130 and the case 110. In addition, the first insulator 160 may include a second protrusion 162. A recess 136 coupled to the second protrusion 162 may be formed in a lower surface of the first terminal plate 134. The second protrusion 162 may be formed at a location where the second protrusion 162 overlaps with the first protrusion 135.

The second terminal unit 140 may include a second current collector 142 and a second terminal plate 144 that are formed integrally with each other. The second terminal unit 140 may be formed of a second material that is different from the first material. For example, the second material may be copper. The second material may be the same as the material of the second electrode plate 154.

The second current collector 142 may penetrate through the second insulator 170 that insulates between the second terminal unit 140 and between the cap plate 120 and the second terminal unit 140 and the case 110. The second current collector 142 may be bonded to the second plain portion 154b via welding. The second current collector 142 and the second plain portion 154b may be formed of copper. The welding between the second current collector 142 and the second plain portion 154b, which may be the same kinds of metal, may provide an excellent bonding strength.

The second terminal plate 144 may be formed different from the first terminal plate 134. The second terminal plate 144 may include a mounting portion 145 having a concave shape, and guide portions 146 at opposite sides of the mounting portion 145.

A second part 220 of the bus bar 200 may be located on the mounting portion 145. The mounting portion 145 may define an assembling location of the bus bar 200. The guide portions 146 may regulate the location of the bus bar 200 during the welding process to prevent the bus bar 200 from escaping, thereby improving an efficiency of the welding process. Also, as will be described below, a boundary between a side surface of the second part 220 and the guide portion 146 may form a welding line W. The guide portions 146 may determine the welding location.

The bus bar 200 may connect the first terminal unit 130 and the second terminal unit 140 of neighboring secondary batteries 100 to each other. Thus, a plurality of secondary batteries 100 may be electrically connected to each other. The bus bar 200 may include the first part 210 bonding to the first terminal plate 134 and the second part 220 bonding to the second terminal plate 144 through laser welding, etc.

The first part 210 of the bus bar 200 may be formed of the first material, that is, aluminum, like the first terminal plate 134. The first part 210 may include the hole 212 in which the protrusion 135 may be inserted. When the first protrusion 135 and the hole 212 are coupled to each other, a location of the first part 210 may be easily determined, and dislocation of the bus bar 200 during the welding process may be prevented. Thus, workability of the welding operation may be improved.

As shown in FIG. 5, the welding may be performed at the boundary between the first protrusion 135 and the hole 212. The boundary between the first protrusion 135 and the hole 212 may form the welding line W. The first terminal plate 134 and the first part 210 may be formed of the same material. Excellent welding strength may be obtained.

The first protrusion 135 may have a height that is the same as a depth of the hole 212. Welding may be performed in a state where the first protrusion 135 and an upper surface of the hole 212 are in contact with each other. Welding may be performed easily, as compared with a case in which welding is performed in a state where a first terminal plate and a bus bar are stacked. In addition, a power of the laser used in the welding process may be reduced.

The second part 220 of the bus bar 200 may be continuously formed from the first part 210. The second part 220 may be formed of the second material, for example, the copper, like the second terminal plate 144. The bus bar 200 may be a clad bus bar 200 in which different materials are bonded to each other.

The second part 220 may be bonded to the second terminal plate 144. The second part 220 may have a different shape from the first part 210. The second part 220 may be mounted on the mounting portion 145, and side surfaces of the second part 220 may contact the guide portions 146. The mounting portion 145 may define an assembling location of the bus bar 200. The guide portions 146 may regulate the location of the bus bar 200 during the welding process in order to prevent the bus bar 200 from escaping and to improve an efficiency of the welding operation.

The welding operation may be performed along boundaries between the side surfaces of the second part 220 and the guide portions 146 as shown in FIG. 5. The side surfaces of the second part 220 may have heights that are the same as those of the guide portions 146. The second part 220 may include a stepped portion S formed on a side portion thereof.

The welding operation may be performed in a state where the second part 220 and the second terminal plate 144 are in contact with each other at the same height level. The welding efficiency may be improved, in comparison with a case where the welding operation is performed in a state where a second terminal plate and a bus bar are stacked. The second part 220 and the second terminal plate 144 may be formed of copper, which is not easily welded. If the welding operation is performed linearly in a state where the second part 220 and the second terminal plate 144 have the same heights, the power of the laser used in the welding operation may be reduced, and the welding may be more easily performed. The second part 220 and the second terminal plate 144 of the same kinds of metal may be welded. Thus, excellent bonding strength may be ensured.

As described above, according to the one or more of the above embodiments, when a bus bar is bonded to a secondary battery, a location of the bus bar may be set easily, and the bus bar and the secondary battery may be bonded to each other with excellent bonding strength.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A secondary battery, comprising:
an electrode assembly including a first electrode plate, a second electrode plate, and a separator between the first electrode plate and the second electrode plate;
a case accommodating the electrode assembly;
a cap plate sealing the case; and
a first terminal unit and a second terminal unit coupled to the cap plate, wherein:
the first terminal unit includes a first terminal plate that is electrically connected to the first electrode plate, and the second terminal unit includes a second terminal plate that is electrically connected to the second electrode plate, the second terminal plate having a different shape from the first terminal plate,
the first terminal plate includes a first protrusion protruding upwardly from an upper surface of the first terminal plate,
the second terminal plate includes a mounting portion having a concave shape, and
the secondary battery further comprises a first insulator disposed between the first terminal plate and the cap plate, wherein:
the first insulator includes a second protrusion, and
a lower surface of the first terminal plate includes a recess coupled to the second protrusion.

2. The secondary battery as claimed in clam 1, wherein the second protrusion overlaps the first protrusion.

3. The secondary battery as claimed in clam 1, wherein:
the first terminal unit includes a first current collector that is integral with the first terminal plate, penetrates through the first insulator, and is bonded to the first electrode plate, and
the first electrode plate, the first current collector, and the first terminal plate are made of aluminum.

4. The secondary battery as claimed in clam 1, wherein the second terminal plate includes guide portions at opposite sides of the mounting portion.

5. The secondary battery as claimed in claim 4, wherein the first protrusion and the guide portions determine a welding location.

6. The secondary battery as claimed in clam 1, further comprising a second insulator between the second terminal plate and the cap plate, wherein:
the second terminal unit includes a second current collector that is integral with the second terminal plate, penetrates through the second insulator, and is bonded to the second electrode plate, and
the second electrode plate, the second current collector, and the second terminal plate are made of copper.

7. A secondary battery module, comprising:
a plurality of secondary batteries arranged in parallel with each other along a direction; and
a plurality of bus bars for electrically connecting the plurality of secondary batteries to each other, wherein:
each of the plurality of secondary batteries includes:
an electrode assembly including a first electrode plate, a second electrode plate, and a separator between the first electrode plate and the second electrode plate;
a case accommodating the electrode assembly;
a cap plate for sealing the case; and
a first terminal unit and a second terminal unit coupled to the cap plate,
wherein the first terminal unit includes a first terminal plate electrically connected to the first electrode plate, and the second terminal unit includes a second terminal plate electrically connected to the second electrode plate, the second terminal plate having a different shape from the first terminal plate,
each of the plurality of bus bars includes a first part bonded to the first terminal plate, and a second part bonded to the second terminal plate, the second part having a different shape from the first part,
the first terminal plate and the first part are made of a first material,
the second terminal plate and the second part are made of a second material that is different from the first material, and
the secondary battery module further comprises a first insulator between the first terminal plate and the cap plate, wherein:
the first insulator includes a second protrusion, and
a lower surface of the first terminal plate includes a recess coupled to the second protrusion.

8. The secondary battery module as claimed in claim 7, wherein:
the first terminal plate includes a first protrusion protruding upwardly from an upper surface of the first terminal plate, and
the first part includes a hole into which the first protrusion is inserted.

9. The secondary battery module as claimed in claim 8, wherein:
the first material is aluminum, and
a boundary between the first protrusion and the hole forms a welding line.

10. The secondary battery module as claimed in claim 7, wherein:
the second terminal plate includes a mounting portion having a concave shape, and
guide portions are at opposite sides of the mounting portion.

11. The secondary battery module as claimed in claim 10, wherein the second part is located on the mounting portion, and
a side surface of the second part has a height that is the same as a height of the guide portions.

12. The secondary battery module as claimed in claim 11, wherein the second part includes a stepped portion on a side portion of the second part.

13. The secondary battery module as claimed in claim 11, wherein:
the second part and the second terminal plate are made of copper, and
a boundary between each of the side surfaces of the second part and each of the guide portions forms a welding line.

14. The secondary battery module as claimed in claim 7, wherein the second protrusion overlaps with the first protrusion.

15. The secondary battery module as claimed in claim 7, wherein:
  the first terminal unit includes a first current collector that is integral with the first terminal plate, penetrates through the first insulator, and is bonded to the first electrode plate, and
  the first electrode plate and the first current collector are made of the first material.

16. The secondary battery module as claimed in claim 7, further comprising a second insulator between the second terminal plate and the cap plate, wherein:
  the second terminal unit includes a second current collector that is integral with the second terminal plate, penetrates through the second insulator, and is bonded to the second electrode plate, and
  the second electrode plate and the second current collector are made of the second material.

* * * * *